(12) United States Patent
Rose et al.

(10) Patent No.: US 11,891,127 B2
(45) Date of Patent: Feb. 6, 2024

(54) DRAG REDUCTION SPOILER

(71) Applicant: Honda Motor Co., Ltd., Tokyo (JP)

(72) Inventors: David J. Rose, West Mansfield, OH (US); Matthew L. Metka, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 227 days.

(21) Appl. No.: 17/464,172

(22) Filed: Sep. 1, 2021

(65) Prior Publication Data

US 2023/0069045 A1 Mar. 2, 2023

(51) Int. Cl.
*B62D 35/00* (2006.01)

(52) U.S. Cl.
CPC .................. *B62D 35/007* (2013.01)

(58) Field of Classification Search
CPC ........ B62D 35/007; B62D 37/02; Y02T 10/82
See application file for complete search history.

(56) References Cited

U.S. PATENT DOCUMENTS

| | | |
|---|---|---|
| 4,925,236 A | 5/1990 | Itoh et al. |
| 7,387,331 B2 | 6/2008 | Froeschle et al. |
| 8,308,222 B2 | 11/2012 | Ondracek |
| 9,802,657 B2 | 10/2017 | Oxley et al. |
| 10,124,840 B2 | 11/2018 | Gandhi et al. |
| 2017/0002904 A1 | 1/2017 | Behle |
| 2019/0047641 A1 | 2/2019 | Claywell et al. |
| 2020/0114986 A1 | 4/2020 | Eulalie et al. |
| 2022/0315135 A1 * | 10/2022 | Moradnia ............ B62D 35/007 |
| 2022/0402564 A1 * | 12/2022 | Rose .................... B62D 35/007 |

FOREIGN PATENT DOCUMENTS

| | | |
|---|---|---|
| DE | 10138027 A1 | 3/2003 |
| DE | 102004030571 B4 | 3/2007 |
| DE | 19902289 B4 | 4/2008 |
| DE | 102008038033 A1 | 2/2010 |
| DE | 102010020548 A1 | 12/2010 |
| DE | 102012002300 A1 | 8/2013 |
| DE | 102016105081 A1 | 9/2017 |
| DE | 102016105994 A1 * | 10/2017 ........... B62D 35/007 |
| DE | 102018209474 A1 | 12/2019 |

(Continued)

*Primary Examiner* — Lori Lyjak (74) *Attorney, Agent, or Firm* — Plumsea Law Group, LLC (57) ABSTRACT

A drag reduction spoiler for a vehicle includes a fixed portion configured for attachment to the vehicle and an extendable top portion configured for movement relative to the fixed portion, the extendable top portion includes a first top portion and a second top portion. The drag reduction spoiler further includes first and second side spoiler portions configured for movement relative to the vehicle, and at least one actuator configured to deploy the extendable top portion, the at least one actuator being secured to the first top portion. The first top portion includes a first engagement element and the second top portion includes a second engagement element, the first engagement element being configured to engage the second engagement element when the first top portion is deployed by the at least one actuator such that the first top portion draws the second top portion outwardly as the first top portion is deployed.

20 Claims, 9 Drawing Sheets

(56) References Cited

FOREIGN PATENT DOCUMENTS

| EP | 2855245 B1 | 4/2016 | |
|---|---|---|---|
| EP | 3112237 A1 * | 1/2017 | ........... B62D 35/007 |
| FR | 2972994 B1 | 11/2013 | |
| FR | 3054994 B1 | 8/2018 | |
| FR | 3064584 B1 | 5/2019 | |
| FR | 3056185 B1 | 6/2019 | |
| JP | 4728906 B2 * | 7/2011 | ............. B60R 1/062 |
| WO | 2008074297 A1 | 6/2008 | |
| WO | 2012138082 A2 | 10/2012 | |
| WO | 2018100271 A1 | 6/2018 | |
| WO | 2019130218 A1 | 4/2019 | |
| WO | 2020023868 A1 | 1/2020 | |
| WO | WO-2021119805 A1 * | 6/2021 | ............. B60R 1/062 |

* cited by examiner

DRAG REDUCTION SPOILER

BACKGROUND

The present disclosure relates to an aerodynamic drag reduction spoiler and more particularly, to an aerodynamic drag reduction spoiler that includes side spoiler portions and top spoiler portions having a first configuration for slower vehicle speeds and a second configuration to reduce the drag force when driving at higher vehicle speeds.

As a vehicle moves in forward motion, the air flowing past the vehicle can influence many aspects of the vehicle's performance including, for example, the drag force on the vehicle. When a vehicle first starts moving forward, the motor uses its power to overcome inertia and mechanical resistance. The motor power needed to overcome aerodynamic drag increases quadratically with speed and becomes significant during highway driving. Hence, reduction in the aerodynamic drag can reduce the motor power consumption and improve the fuel efficiency of the vehicle.

As known in the art, a rear spoiler can be used on a vehicle to assist in reducing the drag force. A spoiler alters air movement over the rear of the vehicle and can improve the overall aerodynamics by extending the air flow separation location, altering the flow angle at the rear of the spoiler, and stabilizing the flow at the rear of the vehicle. The spoiler becomes particularly important on vehicles with a shallow-styled rear silhouette due to the interaction between the wake from the flow over the vehicle cabin and with the rear window. Extension of the air flow separation location beyond the cabin with a spoiler will delay the point of wake growth, improve the pressure on the rear of the vehicle, and reduce drag.

Thus, while rear spoilers can reduce drag resistance on a vehicle, conventional spoilers generally have a fixed geometry, location, and configuration and do not adapt to the changing driving conditions of the vehicle. Moreover, conventional fixed spoilers must also maintain a balance between preserving an aesthetic appeal on the vehicle and reducing the drag resistance.

There is therefore a need in the art for a spoiler system and method that can actively adapt to a change in driving conditions and, at the same time, provide an aesthetically pleasing look to the vehicle.

SUMMARY OF THE INVENTION

The drag reduction spoiler according to the disclosure herein extends the effective roof line of a vehicle at a predetermined speed, and thus extends the air flow separation location, to improve the overall aerodynamic function of the vehicle, while still maintaining an aesthetically pleasing appearance when parked in a vehicle showroom or driving at lower speeds. Hence, the aerodynamic drag reduction spoiler herein has both a retracted configuration providing an aesthetically pleasing appearance and an extended configuration that reduces the drag coefficient and thereby improves the performance of the vehicle when traveling above a predetermined speed.

In one aspect, the disclosure provides a drag reduction spoiler for a vehicle which includes a fixed portion configured for attachment to the vehicle; an extendable top portion configured for movement relative to the fixed portion, the extendable top portion including a first top portion and a second top portion; first and second opposing side spoiler portions configured for movement relative to the vehicle; and at least one actuator configured to deploy the extendable top portion, the at least one actuator being secured to the first top portion. The first and second side spoiler portions have a stowed position and a deployed position, the extendable top portion has a stowed position and a deployed position, and the first top portion includes a first engagement element and the second top portion includes a second engagement element. As such, the first engagement element is configured to engage the second engagement element when the first top portion is deployed by the at least one actuator such that the first top portion draws the second top portion outwardly as the first top portion is deployed.

A system and method for deploying a drag reduction spoiler for a vehicle comprises providing a spoiler having a fixed portion configured for attachment to the vehicle, an extendable top portion configured for movement relative to the fixed portion, the extendable top portion including a first top portion and a second top portion, and first and second opposing side spoiler portions configured for movement relative to the vehicle, providing at least one actuator configured to extend and retract the extendable top portion, and securing the at least one actuator to the first top portion, providing a side actuator for each of the first and second opposing side spoiler portions, actuating the side actuator for each of the first and second opposing side spoiler portions and pivoting the first and second opposing side portions from a folded stowed configuration to an upright deployed configuration, and actuating the at least one actuator and extending the first top portion to an extended deployed position, the first top portion engaging the second top portion and pulling the second top portion to an extended deployed position.

In another aspect, the disclosure provides a vehicle including a roof panel and a rear windshield disposed downward from the roof panel and a drag reduction spoiler configured for attachment to the vehicle. The drag reduction spoiler comprises a fixed spoiler portion configured for attachment to the roof panel, an extendable top portion configured for movement relative to the fixed portion, the extendable top portion including a first top portion and a second top portion, first and second side spoiler portions configured for attachment to opposing sides of the rear windshield, and at least one actuator configured to deploy the extendable top portion where the at least one actuator being secured to the first top portion. The first and second side spoiler portions have a stowed position and a deployed position and the extendable top portion has a stowed position and a deployed position. The first and second side spoiler portions are configured to pivot about a hinge axis between a folded configuration defining the stowed position and a generally vertical configuration defining the deployed position, the stowed position being generally horizontal adjacent the rear windshield and the deployed position being generally vertical relative to the rear windshield. Further, the first and second side spoiler portions each include a first end having a first radius of curvature and a second end having a second radius of curvature, the second radius of curvature being greater than the first radius of curvature.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The reduced drag spoiler according to the disclosure herein is retracted when the vehicle is not moving to give the vehicle the intended aesthetic appearance and the reduced drag spoiler is extended while operating in a forward motion to reduce drag. More particularly, the reduced drag spoiler according to the disclosure herein dynamically adjusts while the vehicle is in operation based on the driving conditions presented, thereby varying the wind resistance effect to improve fuel economy and other performance characteristics of the vehicle. The reduced drag spoiler disclosed herein offers additional benefits over a large fixed spoiler because it allows a cleaner aesthetic appearance and improved rear visibility for the driver when the vehicle is being driven in reverse and at low speeds.

Figure 1:
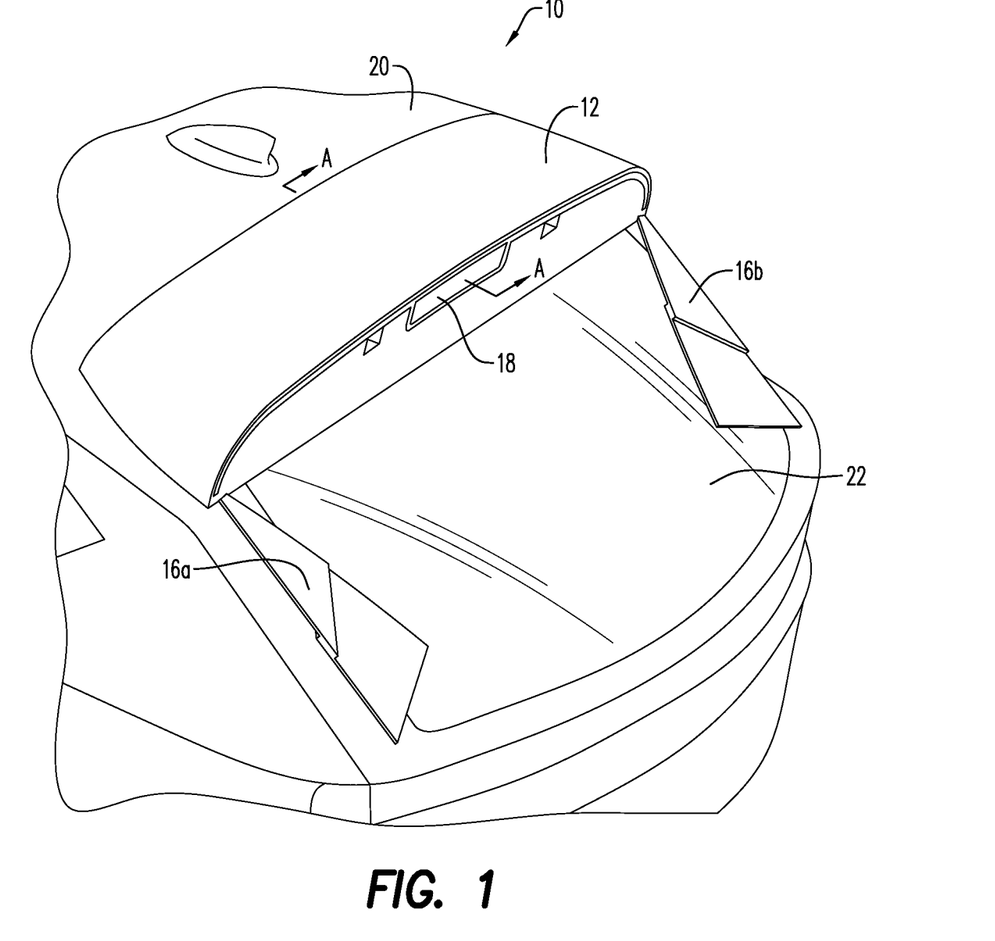
FIG. 1 is a rear perspective view illustrating the drag reduction spoiler according to an exemplary embodiment of the disclosure on a vehicle in the stowed position.
Figure 2:
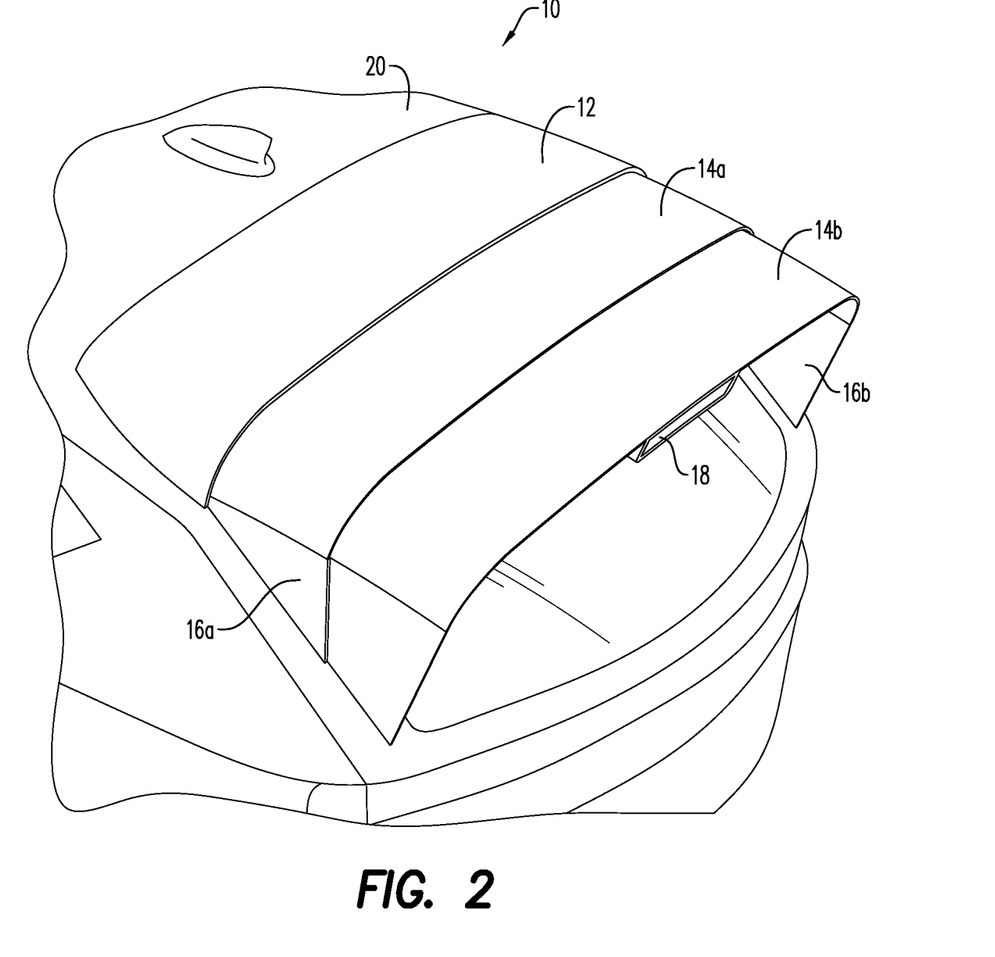
FIG. 2 is a rear perspective view illustrating the drag reduction spoiler according to an exemplary embodiment of the disclosure on a vehicle in the deployed position.
Figures 5A, 5B:
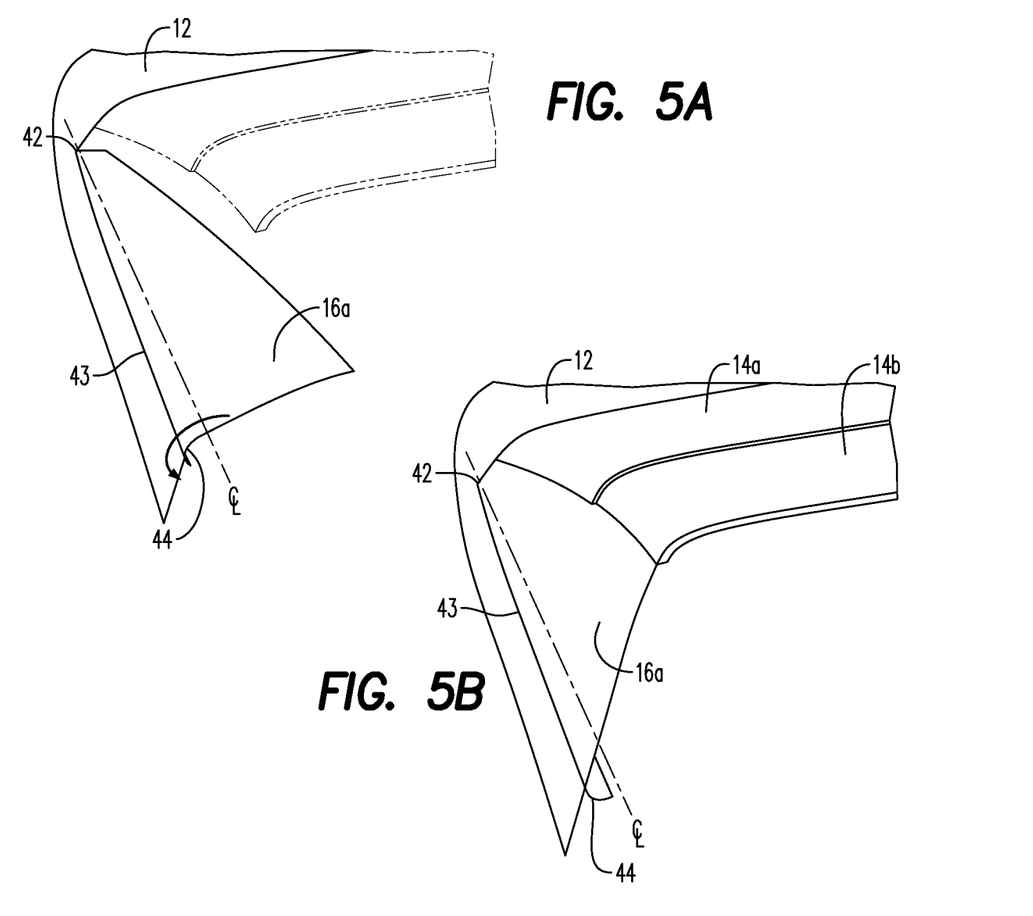
FIGS. 5A-5C schematically illustrate deployment positions of a side spoiler portion of the drag reduction spoiler.

Referring to FIGS. 1 and 2, a reduced drag spoiler according to an exemplary embodiment of the disclosure is shown generally by reference numeral 10. The spoiler 10 is connected to vehicle V at a rearward edge of a roof panel 20 above the rear windshield 22. The spoiler 10 includes a fixed portion 12 connected to the roof panel 20 and moving or extendable top spoiler portions 14a, 14b that move outward relative to fixed portion 12. The reduced drag spoiler 10 further includes moving side spoiler portions 16a, 16b which pivot relative to the vehicle V. The side spoiler portions can have multiple sections as shown in FIG. 1 but can also be a one-piece construction as shown in FIG. 5B, depending on the curvature of the rear window and if a variable radius pivot is used, as discussed further below. The spoiler 10 may further include a center-mounted stop lamp 18 fixed to the rear of the extendable portion 14b of the spoiler. The stop lamp 18 is thus visible from behind the vehicle V when the spoiler 10 is in the retracted position as shown in FIG. 1 and when the spoiler 10 is in the extended position as shown in FIG. 2. The stop lamp 18 is shown as a single light or lamp in the center of the extendable portion 14b in the exemplary embodiment, however, multiple distinct lamps or a plurality of lamps in one or more light bars could of course also be used if desired.

Figure 3A:
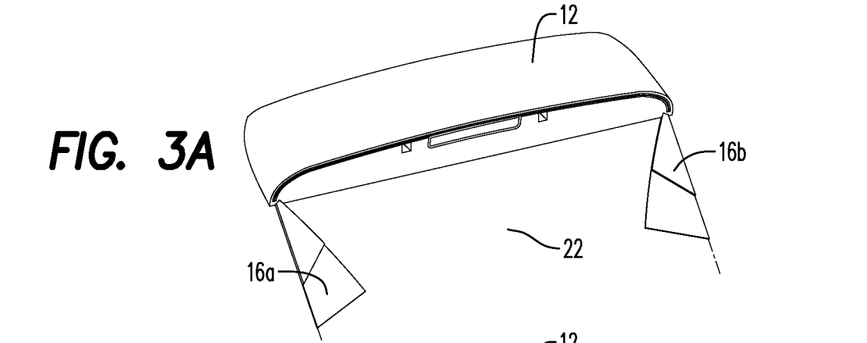
FIGS. 3A-3D schematically illustrate movement of the drag reduction spoiler from the stowed position to the deployed position.
Figure 3B:
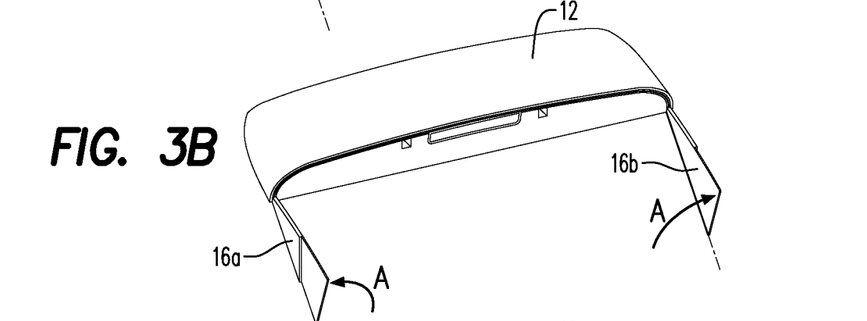
Figure 3C:
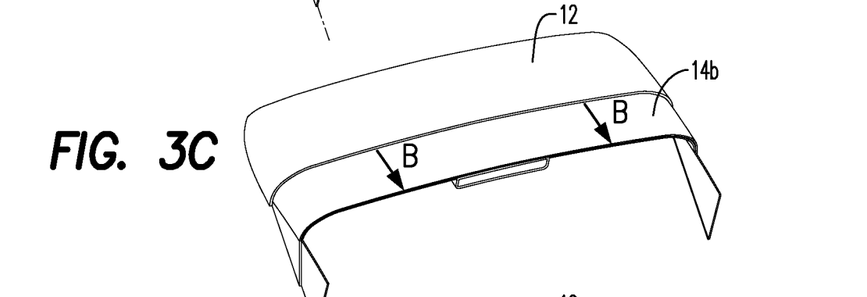
Figure 3D:
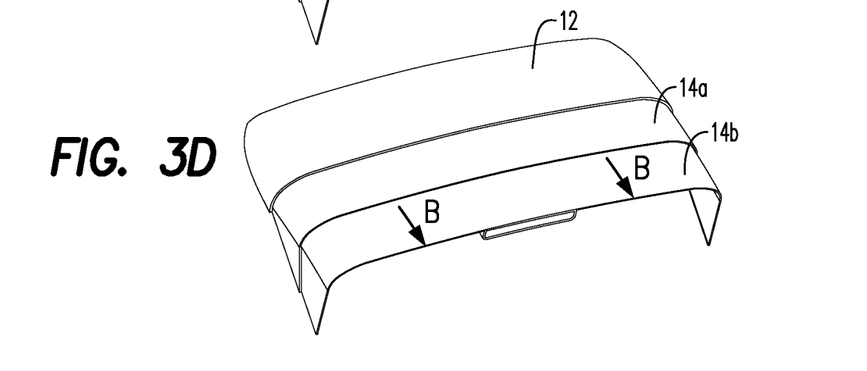

Referring also to FIGS. 3A-3D, the spoiler 10 is deployed from the retracted or stowed position to the extended or deployed position through a series of sequential movements. FIG. 3A illustrates the spoiler 10 in the retracted position with the side spoilers 16a, 16b in the stowed position, which in this case is folded downward against a surface of the vehicle V, and the movable portions 14a, 14b in a retracted configuration. In FIG. 3B, the side spoilers 16a, 16b have been pivoted about a hinge axis as shown by arrows A to obtain a generally upstanding orientation. FIG. 3C illustrates movement of rearward-most top portion 14b by arrows B outward or away from the fixed portion 12 of the spoiler. As top portion 14b continues to be moved outwardly, it pulls along the middle top portion 14a, as shown in FIG. 3D, to obtain the fully deployed position of the spoiler 10.

Figure 4A:
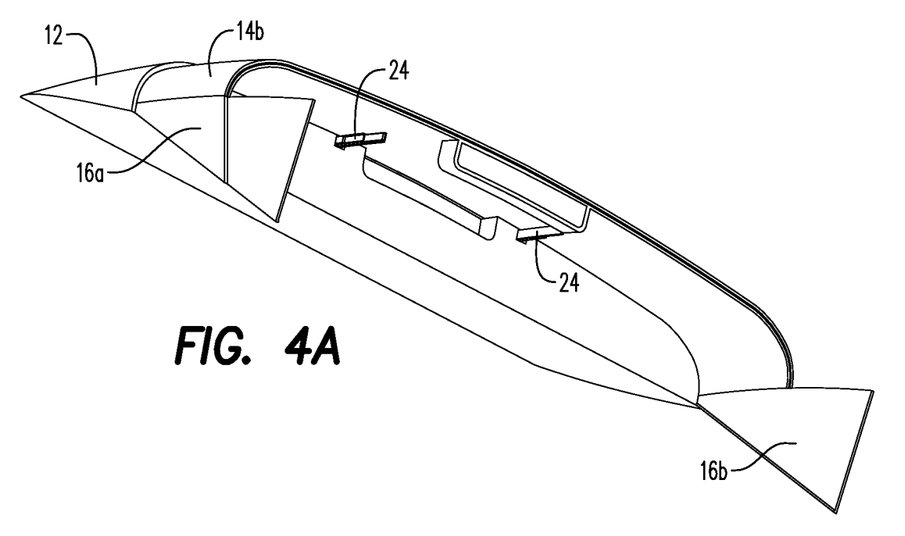
FIGS. 4A and 4B are bottom perspective views illustrating movement of the drag reduction spoiler according to an exemplary embodiment of the disclosure.
Figure 4B:
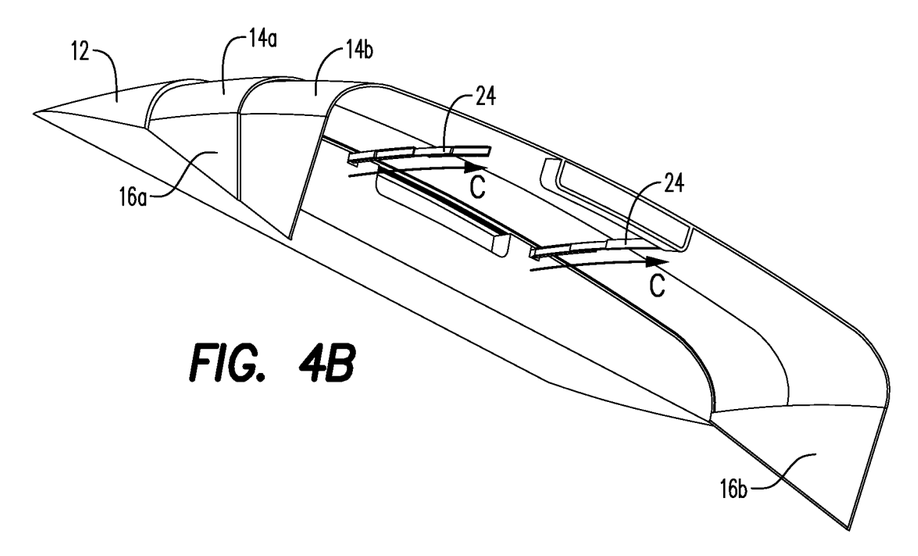
Figure 7:
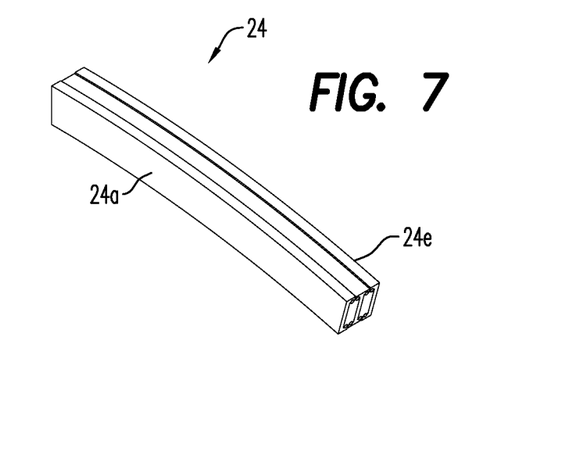
FIG. 7 illustrates a track for the drag reduction spoiler in the stowed position.
Figure 8:
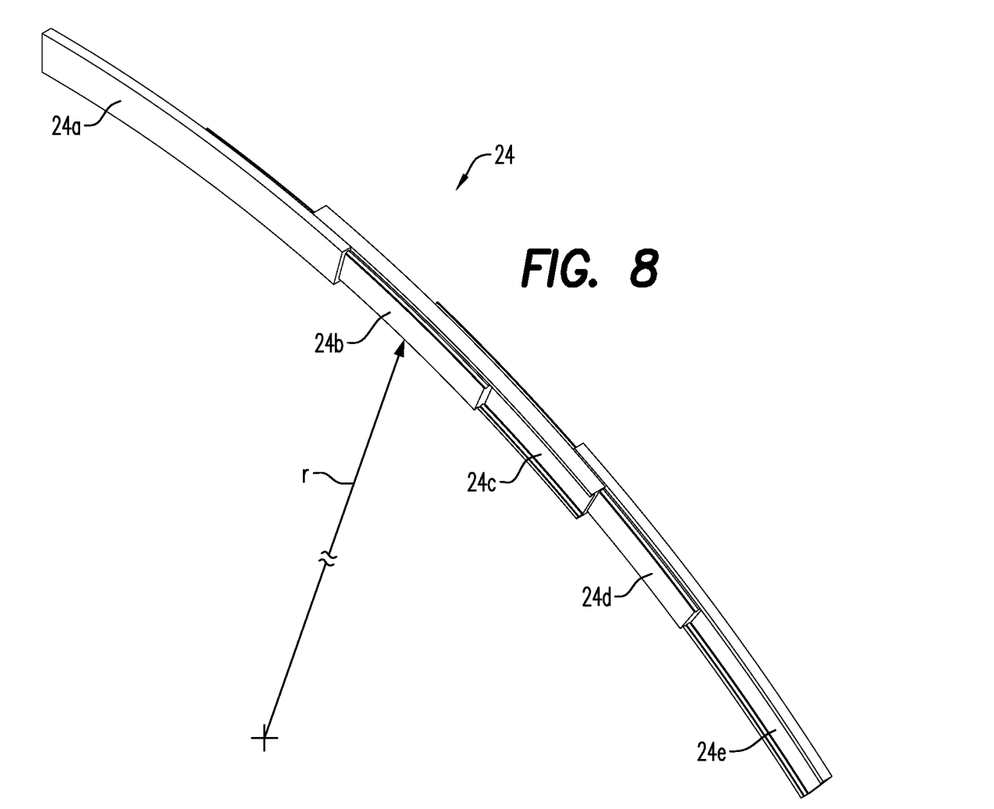
FIG. 8 illustrates a track for the drag reduction spoiler in the deployed position.

FIG. 4A illustrates the underneath or bottom side of the reduced drag spoiler 10 at a state where the side spoiler portions 16a, 16b have been pivoted upwards and the first (rearward-most) extendable top portion 14b has been moved rearwardly by movement of the extendable tracks 24. In FIG. 4B, the tracks 24 have been further extended to fully deploy top portion 14b as well as second (middle) top portion 14a in that top portion 14a is drawn outwardly by the continued outward (rearward) movement of top portion 14b as the tracks 24 are extended in the direction of arrow C. As shown in greater detail in the exemplary embodiment of FIGS. 7 and 8, each of the tracks 24 includes a plurality of telescopic sections 24a, 24b, 24c, 24d, 24e which, when fully extended, form a curved track which not only guides and supports the first and second extendable top portions 14a, 14b outwardly, but also guides the top portions 14a, 14b downwardly in order to improve the aerodynamic airflow over the spoiler 10 when it is deployed. In the exemplary embodiment, the fully deployed track 24 forms an arc having a radius "r" of curvature of approximately 0.5 m to 2.0 m (see FIG. 8), although greater or lesser curvatures could also be utilized if desired. Further, while two tracks 24 are used in the exemplary embodiment of FIGS. 4A, 4B, one skilled in the art will recognize that fewer or additional tracks may be employed depending upon the vehicle and spoiler configuration as required to obtain a smooth deployment of the spoiler 10. Further, while each of the tracks 24 is shown with five curved sections 24a-24e, fewer or additional sections of each track may also be employed as necessary based upon the configuration of the vehicle and spoiler. The actuation mechanism for each of the tracks 24 is discussed further below.

Figure 5C:
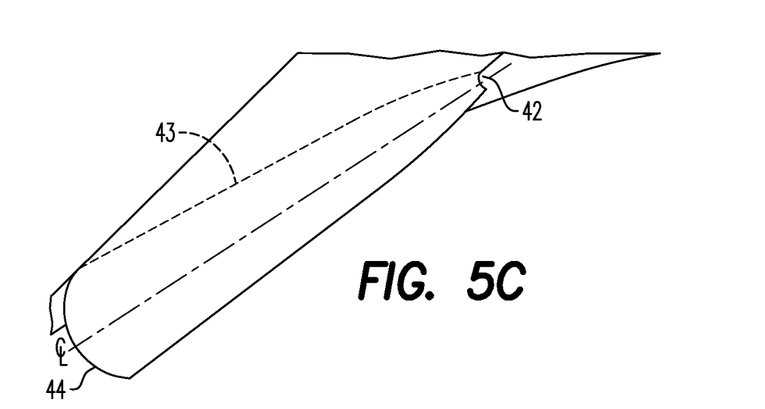

The side spoiler portions 16a, 16b are provided with a variable radius curvature that is smaller at one end and larger at the other in order to match the exterior surface curvature. This allows the pivot 'hinge' to maintain a straight line and assist in concealing the gap 43 between the side spoiler portions and the exterior surface of the vehicle when they are folded down in a stowed position. An exemplary embodiment of this is shown in FIGS. 5A-5C. In FIG. 5C the side spoiler portion is shown in the folded down orientation. The hinge line $C_L$ about which the side spoiler portion pivots includes a first end 42 having a first radius of curvature whereas a second end 44 has a second radius of curvature, with the second radius of curvature being greater than the first radius of curvature. FIG. 5A illustrates the side spoiler portion 16a as it is pivoting upwards to the deployed orientation about the hinge line $C_L$ and FIG. 5B illustrates the side spoiler portion 16a in the fully deployed orientation.

Figures 6A, 6B:
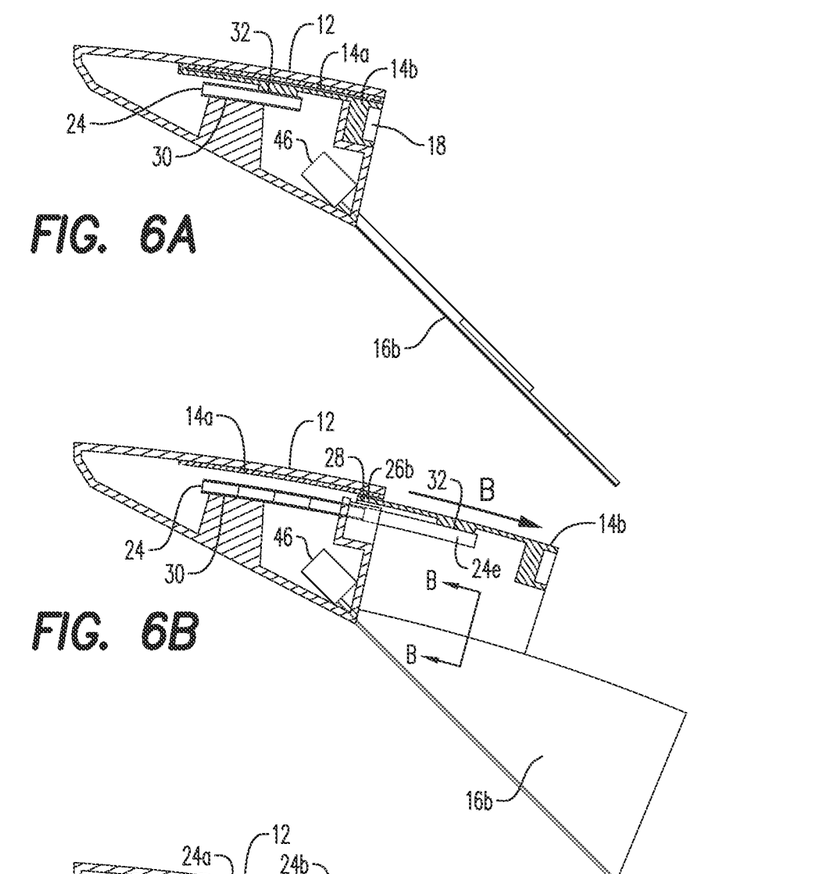
FIGS. 6A-6C schematically illustrate movement of the drag reduction spoiler from the stowed position to the deployed position along cross section line A-A shown in FIG. 1.
Figure 6C:
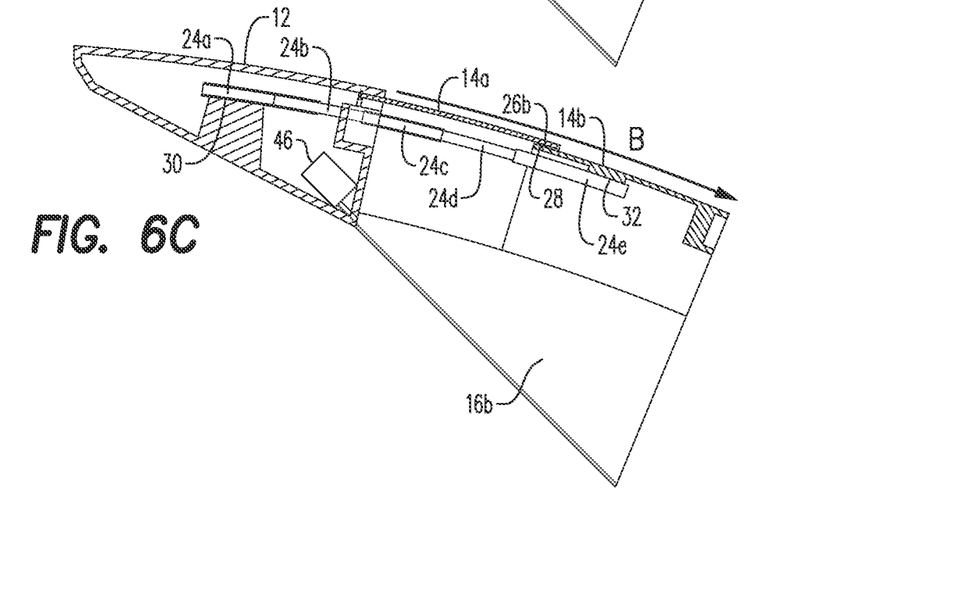
Figure 9A:
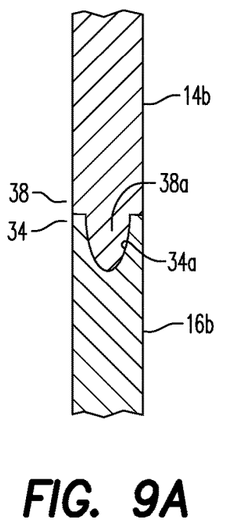
FIGS. 9A-9C schematically illustrate exemplary interfaces of the top spoiler portions and side spoiler portions generally along the cross section line B-B shown in FIG. 6B.
Figure 9B:
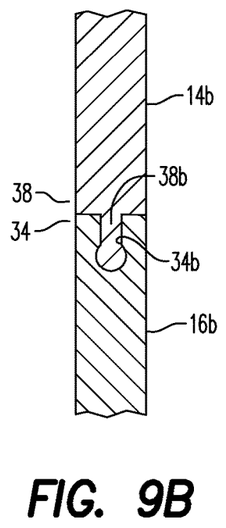
Figure 9C:
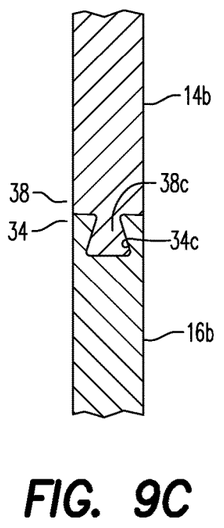
Figure 10:
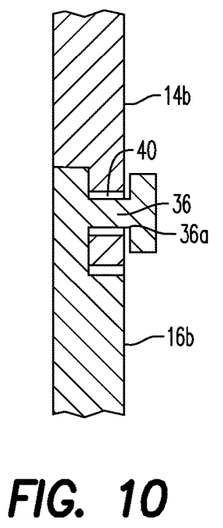
FIG. 10 schematically illustrates an exemplary cross section interface of the top spoiler and side spoiler portions at a terminal end of a side spoiler portion.

FIGS. 6A-6C illustrate in cross section the spoiler 10 as it is deployed from the retracted or stowed position to the extended or deployed position through a series of sequential movements. In FIG. 6A, the spoiler 10 is in the retracted position with both extendable top portions 14a, 14b being retracted and positioned one above another in a stack. The track 24 is secured at a first or lower attachment location 30 to a surface of the housing for spoiler 10 that is attached to the vehicle. The track is also secured at a second or upper attachment location 32 to an underside of the first extendable top portion 14b. The side spoiler portions 16a, 16b (not shown) are also down in the stowed position. Referring next to FIG. 6B, the side spoiler portions 16a, 16b have been rotated upwards to a substantially vertical orientation and the track 24 together with top portion 14b has moved outwardly in the direction of arrow B to a first predetermined distance such that the tab 28 projecting upwardly on the distal or rearward edge of the extendable top portion 14b engages the downwardly projecting tab 26b on the proximal or forward edge of extendable top portion 14a. The track portion 24e is the first section of the telescopic track section 24 to move forward during deployment of the spoiler 10. The joining relationship between the side spoiler portions 16a, 16b and the extendable top portions 14a, 14b during and after deployment is discussed further below relative to the cross section along line B-B shown in FIG. 6B. Further movement in the direction of arrow B fully deploys the spoiler 10, as shown in FIG. 6C, with the track 24 completely extended such that all of the telescopic sections 24a-24e are drawn out to their full extent. The track 24 positioned beneath the middle top portion 14a provides support for the middle top portion 14a even though not it is not secured thereto, in addition to providing support for the rearmost top portion 14b to which it is secured As shown in FIGS. 9A-9C, the upper edge 34 of the side spoiler portions 16a, 16b are configured to engage the lower edge 38 of the top spoiler portions 14a, 14b as the top spoiler portions 14a, 14b are extended in order to guide the top spoiler portions and lend support and further stability to the spoiler 10 in the exemplary embodiment. By way of non-limiting examples, the upper edge 34 of the side spoiler portions 16a, 16b may have a parabolic depression or groove shape such as 34a, 34b, 34c, or any other shape or configuration for engaging the lower edge 38. Similarly, the lower edge 38 of the top spoiler portions 14a, 14b may have a cooperating projecting shape 38a, 38b, 38c which is guided along the groove 34a, 34b, 34c as the spoiler is deployed, or any other configuration for engaging the upper edge 34. Referring also to FIG. 10, the terminal edge 36 of side spoiler portions 16a, 16b may include a stop mechanism or pin shape 36a that limits the further movement of the top spoiler portions 14a, 14b by engaging the terminal edge 40 of the top spoiler portions 14a, 14b.

Figure 11A:
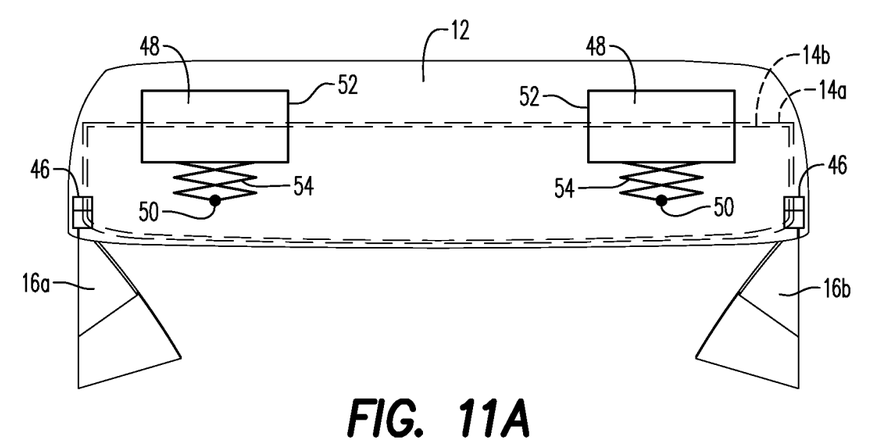
FIGS. 11A and 11B schematically illustrate the actuators on the underside of the drag reduction spoiler in the stowed position and in the deployed position.
Figure 11B:
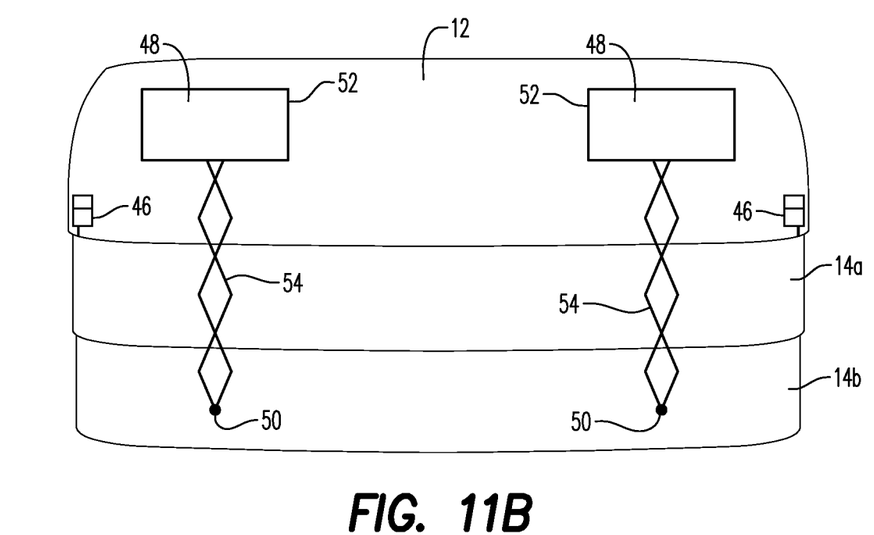

Referring next to FIG. 11A, showing the underside of spoiler 10, the side spoiler actuators 46 rotate the side spoiler portions 16a, 16b into position to guide and engage the top spoiler portions 14a, 14b as they are extended by the actuators 48 for the top spoiler portions 14a, 14b. In the exemplary embodiment of the disclosure, the actuators 48 are scissor drives each including a control box 52 and an extendable scissor 54 which has folding links in a crisscross X pattern (known as a pantograph) which can compress or extend in an accordion like manner. Although two scissor drives 48 are shown, more or less actuators could be used as needed depending upon the specific installation. The control boxes 52 are anchored on the underside of the spoiler 10 and the extendable scissors 54 are secured to the first top portion 14b at connections 50. In FIG. 11B, the first (rearward-most) extendable top portion 14b has moved rearwardly by actuation of the scissor drives 48 and the extension of scissors 54. As the scissors 54 are fully extended, top portion 14a is drawn outwardly by the continued outward (rearward) movement of top portion 14b due to the engagement of downward tab 26b on top spoiler portion 14a and upward tab 28 on top spoiler portion 14b. The deployment of the spoiler 10 is controlled automatically by the onboard computer or other electronics based on the vehicle speed, but could also be based on other driver settings or other inputs if appropriate. In an exemplary embodiment of the disclosure, the spoiler 10 is deployed when the vehicle is travelling at a speed greater than a first predetermined speed, such as 35 to 50 mph and retracted when the vehicle is travelling at a speed less than a second predetermined speed, such as 25 to 40 mph, these speeds being typical examples in one embodiment and non-limiting to the disclosure.

Alternatively, the driver may be able to manually deploy the spoiler if desired, but may or may not be able to retract the spoiler when driving above a given predetermined speed in order to avoid damage to the spoiler itself and diminishing the higher speed handling capabilities of the vehicle.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A drag reduction spoiler for a vehicle comprising:
   a fixed portion configured for attachment to the vehicle;
   an extendable top portion configured for movement relative to the fixed portion, the extendable top portion including a first top portion and a second top portion;
   first and second opposing side spoiler portions configured for movement relative to the vehicle; and
   at least one actuator configured to deploy the extendable top portion, the at least one actuator being secured to the first top portion;
   wherein the first and second side spoiler portions have a stowed position and a deployed position;
   wherein the extendable top portion has a stowed position and a deployed position; and
   wherein the first top portion includes a first engagement element and the second top portion includes a second engagement element, whereby the first engagement element is configured to engage the second engagement element when the first top portion is deployed by the at least one actuator such that the first top portion draws the second top portion outwardly as the first top portion is deployed.

2. The drag reduction spoiler according to claim 1, wherein the first and second side spoiler portions are configured to engage the extendable top portion when both are in the deployed position.

3. The drag reduction spoiler according to claim 1, wherein the first and second side spoiler portions are configured to pivot about a hinge axis between a folded configuration defining the stowed position and a generally vertical configuration defining the deployed position.

4. The drag reduction spoiler according to claim 3, wherein the first and second side spoiler portions each include a first end having a first radius of curvature and a second end having a second radius of curvature, the second radius of curvature being greater than the first radius of curvature.

5. The drag reduction spoiler according to claim 1, further comprising at least one extendable guide track secured to the first top portion, the at least one extendable guide track configured to be extended outwardly when the second top portion is deployed by the at least one actuator.

6. The drag reduction spoiler according to claim 5, wherein the at least one extendable guide track comprises a curved telescoping rail, the at least one extendable guide track configured to also curve downwardly when the at least one extendable guide track is extended outwardly.

7. The drag reduction spoiler according to claim 6, wherein the at least one extendable guide track is configured to support the first top portion when the second top portion is deployed by the at least one actuator.

8. The drag reduction spoiler according to claim 1, wherein the at least one actuator comprises a scissor drive including a control mechanism and an extendable scissor including folding links configured for compression and extension.

9. The drag reduction spoiler according to claim 8, wherein the extendable scissor is secured to the first top portion of the extendable top portion.

10. The drag reduction spoiler according to claim 1, further comprising a first side spoiler actuator for the first side spoiler portion and a second side spoiler actuator for the second side spoiler portion.

11. The drag reduction spoiler according to claim 10, wherein the first and second side spoiler portions each include a first end having a first radius of curvature and a second end having a second radius of curvature, the second radius of curvature being greater than the first radius of curvature, and wherein the first side spoiler and the second side spoiler are configured to be pivoted by the first and second side spoiler actuators, respectively, to guide and engage the extendable top portion as the extendable top portion is extended by the at least one actuator.

12. A vehicle comprising:
a roof panel and a rear windshield disposed downward from the roof panel;
a drag reduction spoiler configured for attachment to the vehicle, the drag reduction spoiler comprising:
a fixed spoiler portion configured for attachment to the roof panel;
an extendable top portion configured for movement relative to the fixed portion, the extendable top portion including a first top portion and a second top portion;
first and second side spoiler portions configured for attachment to opposing sides of the rear windshield; and
at least one actuator configured to deploy the extendable top portion, the at least one actuator being secured to the first top portion;
wherein the first and second side spoiler portions have a stowed position and a deployed position;
wherein the extendable top portion has a stowed position and a deployed position;
wherein the first and second side spoiler portions are configured to pivot about a hinge axis between a folded configuration defining the stowed position and a generally vertical configuration defining the deployed position, the stowed position being generally horizontal adjacent the rear windshield and the deployed position being generally vertical relative to the rear windshield;
wherein the first and second side spoiler portions each include a first end having a first radius of curvature and a second end having a second radius of curvature, the second radius of curvature being greater than the first radius of curvature.

13. The vehicle according to claim 12, wherein the first and second side spoiler portions are configured to engage the extendable top portion when both are in the deployed position.

14. The vehicle according to claim 12, wherein the first top portion includes a first engagement element and the second top portion includes a second engagement element, the first engagement element being configured to engage the second engagement element when the first top portion is deployed by the at least one actuator such that the first top portion draws the second top portion outwardly as the first top portion is deployed.

15. The vehicle according to claim 12, wherein the at least one actuator comprises a scissor drive including a control mechanism and an extendable scissor including folding links configured for compression and extension, the extendable scissor being secured to the first top portion of the extendable top portion.

16. The vehicle according to claim 12, further comprising at least one extendable guide track secured to the first top portion, the at least one extendable guide track configured to be extended outwardly when the second top portion is deployed by the at least one actuator, wherein the at least one extendable guide track comprises a curved telescoping rail, the at least one extendable guide track configured to also curve downwardly when the at least one extendable guide track is extended outwardly.

17. A method of deploying a drag reduction spoiler for a vehicle comprising:
providing a spoiler having a fixed portion configured for attachment to the vehicle, an extendable top portion configured for movement relative to the fixed portion, the extendable top portion including a first top portion and a second top portion, and first and second opposing side spoiler portions configured for movement relative to the vehicle;
providing at least one actuator configured to extend and retract the extendable top portion, and securing the at least one actuator to the first top portion;
providing a side actuator for each of the first and second opposing side spoiler portions;
actuating the side actuator for each of the first and second opposing side spoiler portions and pivoting the first and second opposing side portions from a folded stowed configuration to an upright deployed configuration; and
actuating the at least one actuator and extending the first top portion to an extended deployed position, the first top portion engaging the second top portion and pulling the second top portion to an extended deployed position.

18. The method according to claim 17, wherein actuating the at least one actuator includes extending at least one telescoping guide track secured to the first top portion, the at least one telescoping guide track moving outwardly and curving downwardly as the at least one telescoping guide track is extending.

19. The method according to claim 17, wherein the at least one actuator comprises a scissor drive, and wherein actuating the at least one actuator includes extending a plurality of folding link on an extendable scissor of the scissor drive.

20. The method according to claim 17, further comprising deploying the spoiler when the vehicle is travelling at a speed greater than a first predetermined speed and retracting the spoiler when the vehicle is travelling at a speed less than a second predetermined speed.

\* \* \* \* \*